United States Patent
Ma

(10) Patent No.: US 12,375,639 B1
(45) Date of Patent: Jul. 29, 2025

(54) NAKED-EYE SUSPENDED THREE-DIMENSIONAL VIDEO DISPLAY METHOD, DEVICE, EQUIPMENT AND STORAGE MEDIUM

(71) Applicant: Quansheng Ma, Beijing (CN)

(72) Inventor: Quansheng Ma, Beijing (CN)

( * ) Notice: Subject to any disclaimer, the term of this patent is extended or adjusted under 35 U.S.C. 154(b) by 0 days.

(21) Appl. No.: 18/619,552

(22) Filed: Mar. 28, 2024

(51) Int. Cl.
*G03H 1/22* (2006.01)
*H04N 13/302* (2018.01)
*H04N 13/324* (2018.01)
*H04N 13/349* (2018.01)
*H04N 13/398* (2018.01)

(52) U.S. Cl.
CPC ......... *H04N 13/349* (2018.05); *H04N 13/302* (2018.05); *H04N 13/324* (2018.05); *H04N 13/398* (2018.05)

(58) Field of Classification Search
CPC .. H04N 13/349; H04N 13/302; H04N 13/324; H04N 13/398
See application file for complete search history.

(56) References Cited

U.S. PATENT DOCUMENTS

| | | | |
|---|---|---|---|
| 12,283,065 B1 * | 4/2025 | Li | B22F 10/80 |
| 12,299,828 B2 * | 5/2025 | Steinbrücker | G06V 20/20 |
| 2002/0001045 A1 * | 1/2002 | Ranganath | H04N 19/597 |
| | | | 348/E13.043 |
| 2007/0242237 A1 * | 10/2007 | Thomas | G03B 35/24 |
| | | | 353/94 |
| 2011/0187832 A1 * | 8/2011 | Yoshida | G06F 3/0321 |
| | | | 348/46 |
| 2012/0194514 A1 * | 8/2012 | Sakaguchi | H04N 13/349 |
| | | | 345/419 |
| 2016/0021364 A1 * | 1/2016 | Liao | H04N 13/302 |
| | | | 348/51 |
| 2016/0219260 A1 * | 7/2016 | Sato | H04N 13/305 |

(Continued)

FOREIGN PATENT DOCUMENTS

| | | | | |
|---|---|---|---|---|
| CN | 115866232 A | * | 3/2023 | |
| WO | WO-2011068210 A1 | * | 6/2011 | G02B 27/2214 |

*Primary Examiner* — Howard D Brown, Jr.
(74) *Attorney, Agent, or Firm* — Westbridge IP LLC

(57) ABSTRACT

Disclosed are a naked-eye suspended three-dimensional video display method, a device, an equipment and a storage medium. The method includes: placing a single-viewpoint video file in a preset four-dimensional coordinate system based on a preset parallax, wherein the preset four-dimensional coordinate system is generated by a three-dimensional display coordinate system and a parallax coordinate axis, and the parallax coordinate axis is established based on a multi-viewpoint parameter and the three-dimensional display coordinate system; determining multiple target viewpoints in the preset four-dimensional coordinate system according to a position of the single-viewpoint video file and the multi-viewpoint parameter; rendering the single-viewpoint video file based on each target viewpoint, and obtaining a parallax file corresponding to each target viewpoint; rendering and integrating each parallax file, and obtaining a naked-eye suspended three-dimensional video; determining grating parameters according to the naked-eye suspended three-dimensional video; and displaying the naked-eye suspended three-dimensional video.

10 Claims, 5 Drawing Sheets

(56) References Cited

U.S. PATENT DOCUMENTS

2016/0295200 A1* 10/2016 Bruls .................... H04N 13/128
2018/0144537 A1*  5/2018 Park ....................... H04N 13/32
2022/0397862 A1* 12/2022 Karafin ................ H04N 13/346

* cited by examiner obtaining a corresponding multi-viewpoint parameter according to the naked-eye suspended three-dimensional video — S51 determining the grating parameters according to the multi-viewpoint parameter — S52

NAKED-EYE SUSPENDED THREE-DIMENSIONAL VIDEO DISPLAY METHOD, DEVICE, EQUIPMENT AND STORAGE MEDIUM

TECHNICAL FIELD

The present application relates to the technical field of three-dimensional (3D) display, and in particular to a naked-eye suspended three-dimensional video display method, a naked-eye suspended three-dimensional video display device, a naked-eye suspended three-dimensional video display equipment and a storage medium.

BACKGROUND

At present, in display technology, human expression of the three-dimensional world has been limited to the three-dimensional display of three-dimensional platforms, and the current three-dimensional platform can only construct a three-dimensional space without parallax, that is, the XYZ coordinate system is used to describe the specific physical characteristics of a three-dimensional object. We call this three-dimensional object without parallax a single-viewpoint three-dimensional image.

However, in nature, humans really see things through their eyes with parallax. When viewing a single-viewpoint three-dimensional image, from the perspective of visual senses, there is no difference in the three-dimensional images seen by both eyes, which results in low visual impact and poor suspension effect of the three-dimensional images.

The above content is only used to assist in understanding the technical solution of the present application, and does not represent an admission that the above content is prior art.

SUMMARY

The main purpose of the present application is to provide a naked-eye suspended three-dimensional video display method, a naked-eye suspended three-dimensional video display device, a naked-eye suspended three-dimensional video display equipment and a storage medium, which aims to solve the technical problem of inaccurate evaluation of algorithmic trading execution in prior art.

To achieve the above objectives, the present application provides a naked-eye suspended three-dimensional video display method, including the following steps:

placing a single-viewpoint video file in a preset four-dimensional coordinate system based on a preset parallax, the preset four-dimensional coordinate system is generated by a three-dimensional display coordinate system and a parallax coordinate axis, and the parallax coordinate axis is established based on a multi-viewpoint parameter and the three-dimensional display coordinate system;

determining multiple target viewpoints in the preset four-dimensional coordinate system according to a position of the single-viewpoint video file and the multi-viewpoint parameter;

rendering the single-viewpoint video file based on each target viewpoint, and obtaining a parallax file corresponding to each target viewpoint;

rendering and integrating each parallax file, and obtaining a naked-eye suspended three-dimensional video;

determining grating parameters according to the naked-eye suspended three-dimensional video; and displaying the naked-eye suspended three-dimensional video according to the grating parameters.

In an embodiment, the placing the single-viewpoint video file in the preset four-dimensional coordinate system based on the preset parallax includes:

determining a target placement position on the parallax coordinate axis in the preset four-dimensional coordinate system based on the preset parallax; and taking the target placement position as a location of the single-viewpoint video file, and placing the single-viewpoint video file in the target placement position.

In an embodiment, before the determining the target placement position on the parallax coordinate axis in the preset four-dimensional coordinate system based on the preset parallax, further includes:

establishing the parallax coordinate axis based on the multi-viewpoint parameter and the three-dimensional display coordinate system; and determining a display sub-coordinate system according to the multi-viewpoint parameter, and establishing the preset four-dimensional coordinate system according to the display sub-coordinate system and the parallax coordinate axis.

In an embodiment, the determining multiple target viewpoints in the preset four-dimensional coordinate system according to the position of the single-viewpoint video file and the multi-viewpoint parameter includes:

determining a target shooting axis in the preset four-dimensional coordinate system according to the position of the single-viewpoint video file; and determining the multiple target viewpoints at preset intervals according to the target shooting axis and the multi-viewpoint parameter.

In an embodiment, the determining grating parameters according to the naked-eye suspended three-dimensional video includes:

obtaining a corresponding multi-viewpoint parameter according to the naked-eye suspended three-dimensional video; and determining the grating parameters according to the multi-viewpoint parameter.

In an embodiment, before the placing the single-viewpoint video file in the preset four-dimensional coordinate system based on the preset parallax, further includes:

performing cutout processing to an original video file, and obtaining a transparent display video file; and taking the transparent display video file as the single-viewpoint video file.

In an embodiment, the rendering the single-viewpoint video file based on each target viewpoint, and obtaining the parallax file corresponding to each target viewpoint includes:

shooting the single-viewpoint video file based on each target viewpoint, and obtaining a shooting file; and coloring each pixel in the shooting file, and obtaining the parallax file corresponding to each target viewpoint.

In addition, to achieve the above objectives, the present application further proposes a naked-eye suspended three-dimensional video display device, including:

a file placement module configured to place a single-viewpoint video file in a preset four-dimensional coordinate system based on a preset parallax, the preset four-dimensional coordinate system is generated by a three-dimensional display coordinate system and a parallax coordinate axis, and the parallax coordinate axis is established based on a multi-viewpoint parameter and the three-dimensional display coordinate system;

a viewpoint determination module configured to determine multiple target viewpoints in the preset four-dimensional coordinate system according to a position of the single-viewpoint video file and the multi-viewpoint parameter;

a file rendering module configured to render the single-viewpoint video file based on each target viewpoint, and obtain a parallax file corresponding to each target viewpoint;

a file integration module configured to render and integrate each parallax file, and obtain a naked-eye suspended three-dimensional video;

a parameter determination module configured to determine grating parameters according to the naked-eye suspended three-dimensional video; and a video display module configured to display the naked-eye suspended three-dimensional video according to the grating parameters.

In addition, to achieve the above objectives, the present application further proposes a naked-eye suspended three-dimensional video display equipment, including: a memory, a processor and a naked-eye suspended three-dimensional video display program stored on the memory and operable on the processor, the naked-eye suspended three-dimensional video display program is configured to realize the naked-eye suspended three-dimensional video display method as described above.

In addition, to achieve the above objectives, the present application further proposes a storage medium storing a naked-eye suspended three-dimensional video display program, the naked-eye suspended three-dimensional video display method as described above is realized when the naked-eye suspended three-dimensional video display program is executed by a processor.

The present application places a single-viewpoint video file in a preset four-dimensional coordinate system based on a preset parallax, the preset four-dimensional coordinate system is generated by a three-dimensional display coordinate system and a parallax coordinate axis, and the parallax coordinate axis is established based on a multi-viewpoint parameter and the three-dimensional display coordinate system; determines multiple target viewpoints in the preset four-dimensional coordinate system according to a position of the single-viewpoint video file and the multi-viewpoint parameter; renders the single-viewpoint video file based on each target viewpoint, and obtains a parallax file corresponding to each target viewpoint; renders and integrates each parallax file, and obtains a naked-eye suspended three-dimensional video; determines grating parameters according to the naked-eye suspended three-dimensional video; and displays the naked-eye suspended three-dimensional video according to the grating parameters. Since the present application establishes the parallax coordinate axis on a basis of the three-dimensional display coordinate system by combining multi-viewpoint parameters, and establish a preset four-dimensional coordinate system based on the parallax coordinate axis, then places the single-viewpoint video file into the above-mentioned preset four-dimensional coordinate system, renders the above-mentioned single-viewpoint video file by multiple target viewpoints, and obtains a parallax file corresponding to each target viewpoint; renders and integrates each parallax file, and obtains a naked-eye suspended three-dimensional video; determines grating parameters according to the naked-eye suspended three-dimensional video; and displays the naked-eye suspended three-dimensional video according to the grating parameters finally. Compared with the existing three-dimensional images that have low visual impact, the present application can convert a single-viewpoint three-dimensional image into a multi-viewpoint three-dimensional image, so that the user can see a three-dimensional image with parallax with both eyes, thus enhancing the suspension effect, and improving the user experience at the same time.

The realization of the purpose, functional features and advantages of the present application will be further described in conjunction with the embodiments and with reference to the accompanying drawings.

DETAILED DESCRIPTION OF THE EMBODIMENTS

It should be understood that the specific embodiments described here are only used to explain the present application and are not intended to limit the present application.

Figure 1:
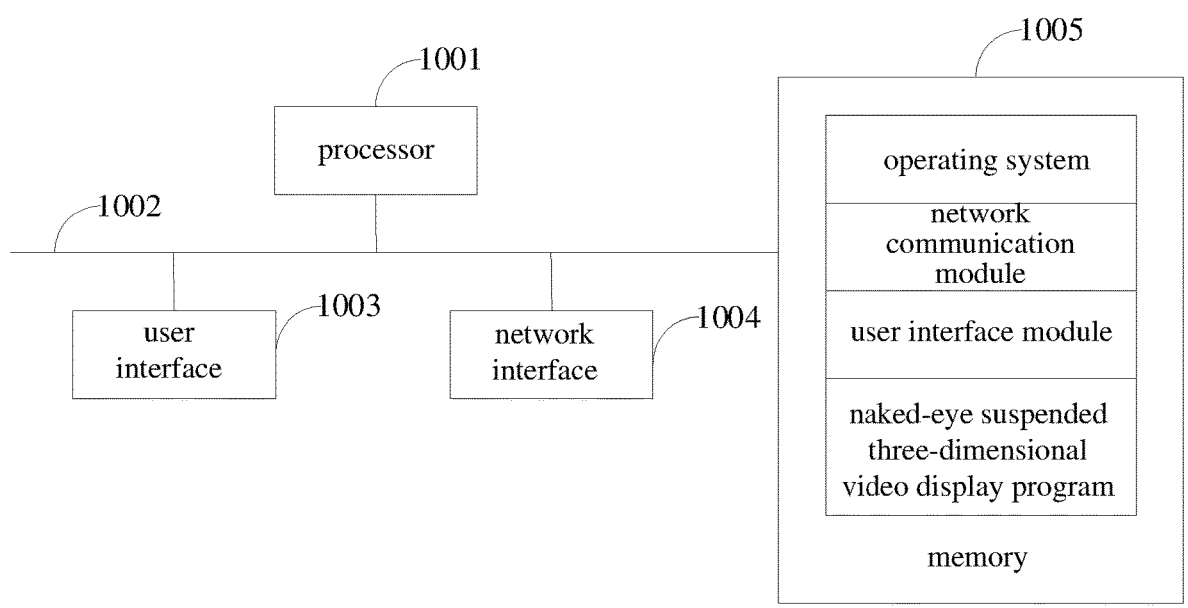
FIG. 1 is a structural schematic view of a naked-eye suspended three-dimensional video display equipment of a hardware operating environment involved in an embodiment of the present application.

Refer to FIG. 1, which is a structural schematic view of a naked-eye suspended three-dimensional video display equipment of a hardware operating environment involved in an embodiment of the present application.

As shown in FIG. 1, the naked-eye suspended three-dimensional video display equipment may include: a processor 1001, for example, Central Processing Unit (CPU), a communication bus 1002, a user interface 1003, a network interface 1004, and a memory 1005. The communication bus 1002 is configured to realize connection and communication between these components. The user interface 1003 may include a display and an input unit such as a keyboard. In an embodiment, the user interface 1003 may further include standard wired interfaces and wireless interfaces. In an embodiment, the network interface 1004 may include a standard wired interface or a wireless interface (such as a Wireless-Fidelity (Wi-Fi) interface). Memory 1005 can be a high-speed Random Access Memory (RAM), and it can also be a stable Non-Volatile Memory (NVM), for example, a disk storage memory. In an embodiment, the memory 1005 may further be a storage device independent of the aforementioned processor 1001.

Those skilled in the art can understand that the structure shown in FIG. 1 does not constitute a limitation on the naked-eye suspended three-dimensional video display equipment, can include more or fewer components than shown, or a combination of certain components, or differently arranged components.

As shown in FIG. 1, the memory 1005 as a storage medium can include an operating system, a network communication module, a user interface module, and a naked-eye suspended three-dimensional video display program.

In the naked-eye suspended three-dimensional video display equipment shown in FIG. 1, the network interface 1004 is mainly configured for data communication with the network server, and the user interface 1003 is mainly configured for data interaction with users. The processor 1001 and the memory 1005 in the naked-eye suspended three-dimensional video display equipment of the present application can be provided in the naked-eye suspended three-dimensional video display equipment. The naked-eye suspended three-dimensional video display equipment calls the naked-eye suspended three-dimensional video display program stored in the memory 1005 by the processor 1001, and executes the naked-eye suspended three-dimensional video display method provided by the embodiment of the present application.

Figure 2:
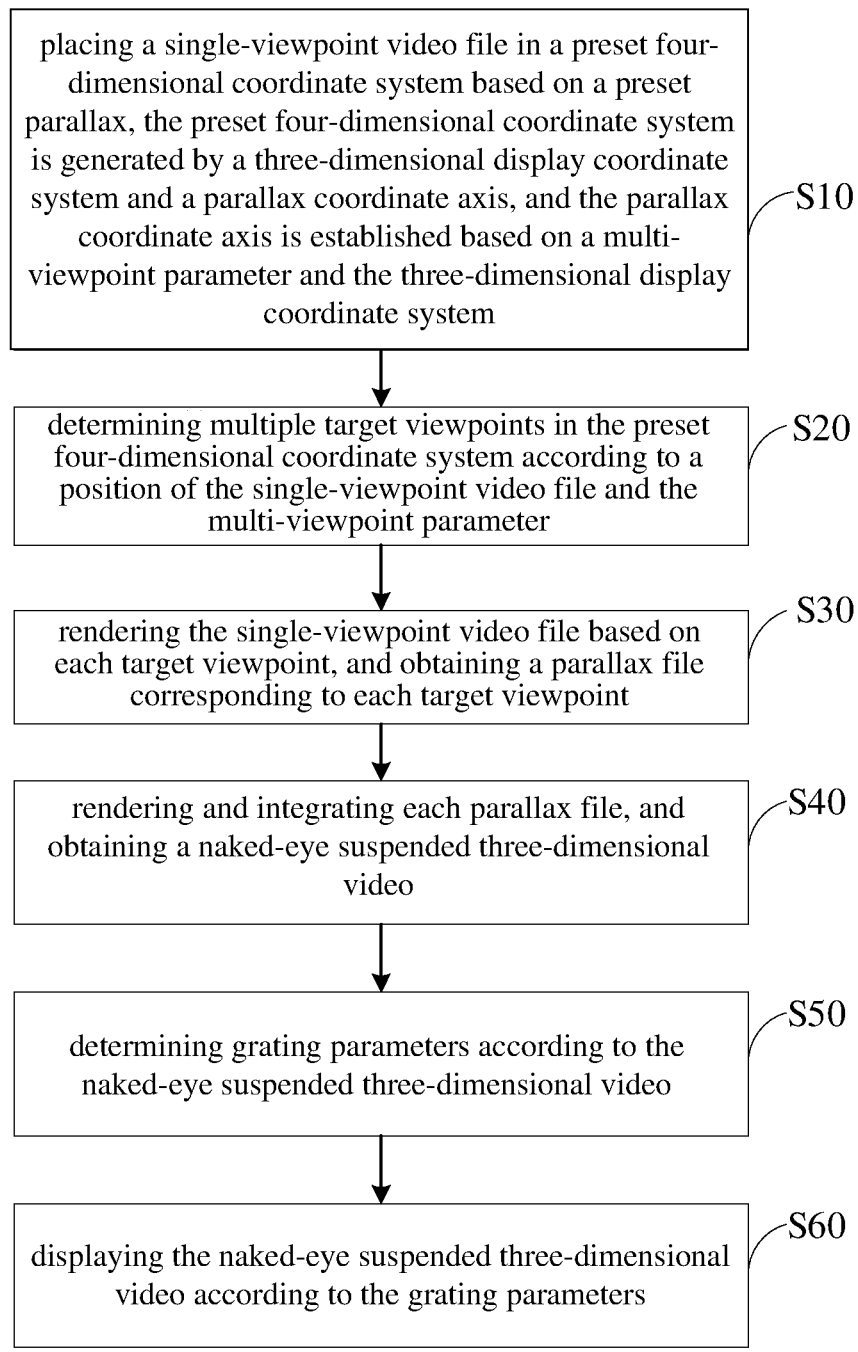
FIG. 2 is a schematic flow chart of a naked-eye suspended three-dimensional video display method according to a first embodiment of the present application.

Embodiments of the present application provide a naked-eye suspended three-dimensional video display method, refer to FIG. 2, which is a schematic flow chart of a naked-eye suspended three-dimensional video display method according to the first embodiment of the present application.

In this embodiment, the above naked-eye suspended three-dimensional video display method includes the following steps.

Step S10: placing a single-viewpoint video file in a preset four-dimensional coordinate system based on a preset parallax, the preset four-dimensional coordinate system is generated by a three-dimensional display coordinate system and a parallax coordinate axis, and the parallax coordinate axis is established based on a multi-viewpoint parameter and the three-dimensional display coordinate system.

It should be noted that the method of this embodiment can be applied in a scenario where a naked-eye suspended three-dimensional video is displayed, or in other scenarios where a three-dimensional video needs to be displayed. The execution subject of this embodiment may be a naked-eye suspended three-dimensional video display equipment with data processing, network communication and program running functions, for example, computers, etc., or other equipment that can achieve the same or similar functions. Here, this embodiment and the following embodiments will be described in detail using the above naked-eye suspended three-dimensional video display equipment (hereinafter referred to as equipment).

It can be understood that the above-mentioned multi-viewpoint parameter may include a parallax value parameter of both eyes of the user, and the above-mentioned three-dimensional display coordinate system may be an XYZ coordinate system. Based on the XYZ coordinate system, different parallax value parameters can correspond to different coordinate origins. In this embodiment, the above-mentioned equipment can determine several coordinate origins according to the above-mentioned multi-viewpoint parameter and establish several sub-coordinate systems based on the above-mentioned coordinate origins, and the parallax coordinate axis can be determined according to the sub-coordinate system.

Figure 3:
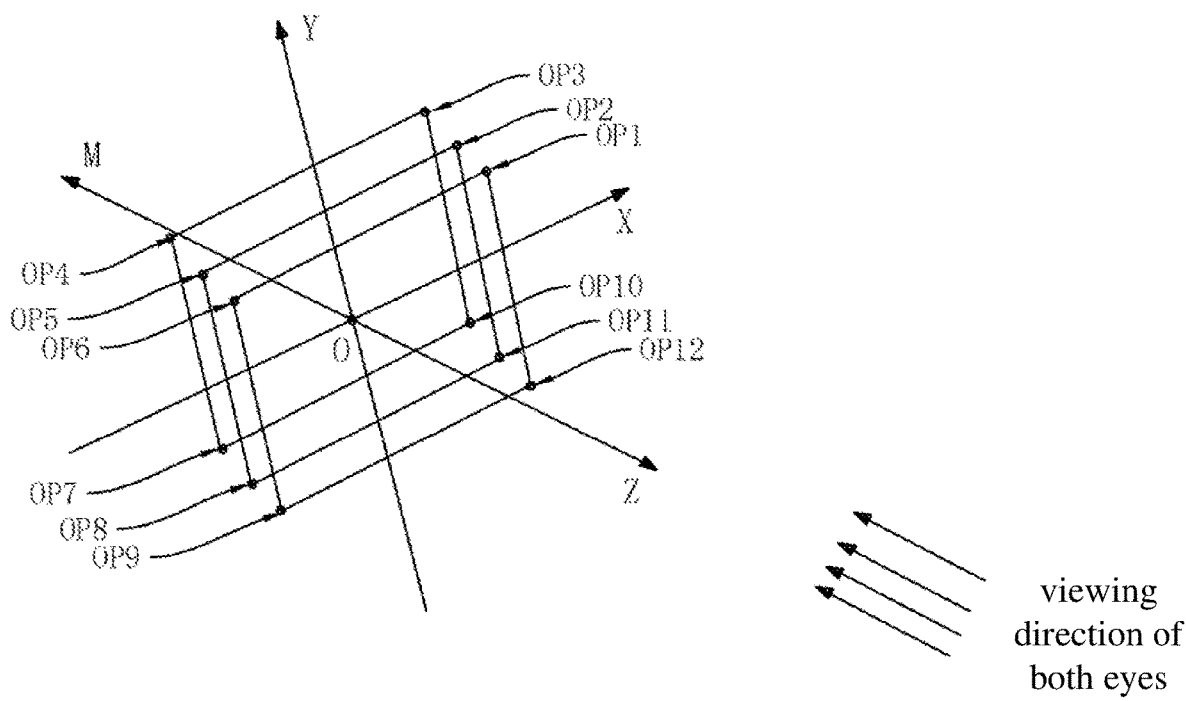
FIG. 3 is a structural schematic view of a preset four-dimensional coordinate system in the naked-eye suspended three-dimensional video display method according to the first embodiment of the present application.

It should be understood that the direction of the above parallax coordinate axis is the opposite direction of the Z axis in the three-dimensional display coordinate system. For ease of understanding, refer to FIG. 3 for explanation. FIG. 3 is a structural schematic view of a preset four-dimensional coordinate system in the naked-eye suspended three-dimensional video display method according to the first embodiment of the present application. As shown in FIG. 3, O is the origin, and the X-axis, Y-axis, and Z-axis are the three-dimensional display coordinate system. Based on the above three-dimensional display coordinate system, the M axis is established in the opposite direction of the Z axis, the above M axis is the parallax coordinate axis, the direction of the M axis is the opposite direction of the Z axis, and a preset four-dimensional coordinate system is generated based on the parallax coordinate axis and the three-dimensional display coordinate system.

It should be explained that the above single-viewpoint video file can be a video file with any content. The user can download the single-viewpoint video file into the above-mentioned equipment, or the above-mentioned equipment can directly obtain it from the cloud, which is not limited in this embodiment.

Furthermore, in order to ensure the accuracy of the position of the inserted single-viewpoint video file, in this embodiment, the above step S10 includes: determining a target placement position on the parallax coordinate axis in the preset four-dimensional coordinate system based on the preset parallax; and taking the target placement position as a location of the single-viewpoint video file, and placing the single-viewpoint video file in the target placement position.

It should be noted that the above preset parallax can be a positive value or a negative value. Different preset parallax can enable the human retina to generate a parallax stereoscopic image by the fusion of the brain. The parallax stereoscopic image can truly reflect the characteristics and motion attributes of the object itself. For ease of understanding, continue as shown in FIG. 2, the plane where the X-axis and the Y-axis are located constitutes the plane of the display screen. If the preset parallax is a positive value, then the target placement position mentioned above is in the positive direction of the M-axis, that is, it is displayed on the side of the display plane away from the viewing direction of both eyes. If the preset parallax is a negative value, then the target placement position mentioned above is in the positive direction of the Z-axis, that is, on the side of the display plane close to the viewing direction of the eyes.

It should be emphasized that when the above preset parallax constantly changes from a positive value to a negative value, the effect of viewing from the viewing direction of both eyes can be a phenomenon of flying out of the display plane.

In order to further determine the target placement position of the single-viewpoint video file, before the above step of determining the target placement position on the parallax coordinate axis in the preset four-dimensional coordinate system based on the preset parallax, further includes: establishing the parallax coordinate axis based on the multi-viewpoint parameter and the three-dimensional display coordinate system; and determining a display sub-coordinate system according to the multi-viewpoint parameter, and establishing the preset four-dimensional coordinate system according to the display sub-coordinate system and the parallax coordinate axis.

For ease of understanding, continue to refer to FIG. 3 for description. In this embodiment, the above equipment can first establish the parallax coordinate axis based on the multi-viewpoint parameter and the three-dimensional display coordinate system, which is the M axis in FIG. 3. Secondly, selecting any point in the three-dimensional display coordinate system as the origin of the display sub-coordinate system. In FIG. 3, OP1 to OP12 can all represent the origin of the display sub-coordinates. OP1, OP6, OP9 and OP12 are on the same plane, and this plane is located in the positive direction of the Z-axis of the above-mentioned display screen plane. OP2, OP5, OP8, OP11 and O are on the same plane, that is, the above-mentioned display screen plane. OP3, OP4, OP7 and OP10 are on the same plane, and this plane is located in the positive direction of the M-axis of the above-mentioned display screen plane.

It is understandable that the above equipment can determine the origins of the display sub-coordinate system according to the multi-viewpoint parameter, the origins of the display sub-coordinate system are based on the preset four-dimensional coordinate system and all have corresponding coordinate values. Establishing a display sub-coordinate system according to the origins of the display sub-coordinate system, the above preset four-dimensional coordinate system can be constructed by several display sub-coordinate systems, and the target placement position of the above single-viewpoint video file is the origin position of the corresponding display sub-coordinate system.

In a specific implementation, the above equipment can establish a parallax coordinate axis based on a multi-viewpoint parameter and a three-dimensional display coordinate system, at the same time, determine the corresponding display sub-coordinate system according to the multi-viewpoint parameter, and establish the preset four-dimensional coordinate system jointly according to the determined display sub-coordinate system and the parallax coordinate axis; then, based on the preset parallax, determine the origin of the display sub-coordinate system on the parallax coordinate axis in the preset four-dimensional coordinate system, take the origin of the display sub-coordinate system as the target placement position, set the above target placement position as the position of the single-viewpoint video file, and place the single-viewpoint video file into the above target placement position.

Step S20: determining multiple target viewpoints in the preset four-dimensional coordinate system according to a position of the single-viewpoint video file and the multi-viewpoint parameter.

It should be noted that the above multi-viewpoint parameter further includes the number of target viewpoints. The user can determine the number of target viewpoints according to actual needs. The number of target viewpoints mentioned above may be at least two, which is not limited in this embodiment. However, for ease of understanding, this embodiment takes eight viewpoints for explanation.

It can be understood that the above equipment can determine the coordinate position of each target viewpoint in the preset four-dimensional coordinate system according to the number of target viewpoints, and the specific coordinate position can be set by oneself according to the actual situation.

In specific implementation, the above equipment can determine the coordinate position of the corresponding target viewpoint according to the position of the single-viewpoint video file in the preset four-dimensional coordinate system and the multi-viewpoint parameter.

Step S30: rendering the single-viewpoint video file based on each target viewpoint, and obtaining a parallax file corresponding to each target viewpoint.

It should be understood that the above equipment can set up a virtual camera at the position of the target viewpoint, and the virtual camera can shoot a single-viewpoint video file at the corresponding angle of view, and rendering is performed on the files captured by the shooting, and a strictly defined language or data structure is used to describe the files captured, including geometry, corresponding target viewpoint, texture, lighting and other information, and finally the image at the corresponding angle of view is generated.

Step S40: rendering and integrating each parallax file, and obtaining a naked-eye suspended three-dimensional video.

In the specific implementation, after the above equipment shoots and renders the single-viewpoint video file based on each target viewpoint, the parallax file corresponding to the target viewpoint can be obtained, and then rendering and integrating each parallax file to obtain a multi-viewpoint naked-eye suspended three-dimensional video.

Step S50: determining grating parameters according to the naked-eye suspended three-dimensional video.

Step S60: displaying the naked-eye suspended three-dimensional video according to the grating parameters.

It should be noted that since the generated naked-eye suspended three-dimensional video needs to be transported by the display screen light splitter, there are certain requirements for the grating parameters of the display screen. When displaying, the above equipment can determine the grating parameters according to the relevant parameters of the naked-eye suspended three-dimensional video, and then display the above naked-eye suspended three-dimensional video according to the above grating parameters.

This embodiment can establish the parallax coordinate axis based on the multi-viewpoint parameter and the three-dimensional display coordinate system, at the same time, determine the corresponding display sub-coordinate system according to the multi-viewpoint parameter, and jointly establish the preset four-dimensional coordinate system according to the determined display sub-coordinate system and the parallax coordinate axis; then, determine the origin of the display sub-coordinate system on the parallax coordinate axis in the preset four-dimensional coordinate system based on the preset parallax, take the origin of the display sub-coordinate system as a target placement position, take the target placement position as a location of the single-viewpoint video file, and place the single-viewpoint video file in the target placement position; determine the coordinate position of the corresponding target viewpoints according to a position of the single-viewpoint video file in the preset four-dimensional coordinate system and the multi-viewpoint parameter; after shooting and rendering the single-viewpoint video file based on each target viewpoint, a parallax file corresponding to target viewpoint can be obtained; then render and integrate each parallax file, thereby a multi-viewpoint naked-eye suspended three-dimensional video can be obtained. When displaying, the above equipment can determine the grating parameters according to the relevant parameters of the naked-eye suspended three-dimensional video, and then display the above naked-eye suspended three-dimensional video according to the above grating parameters. Since this embodiment can render and integrate a single-viewpoint video file based on a preset four-dimensional coordinate system, obtain a naked-eye suspended three-dimensional video, and then display the above naked-eye suspended three-dimensional video by the corresponding grating parameters, so that the user can see a three-dimensional image with parallax with both eyes, thus enhancing the suspension effect, and improving the user experience at the same time.

Figure 4:
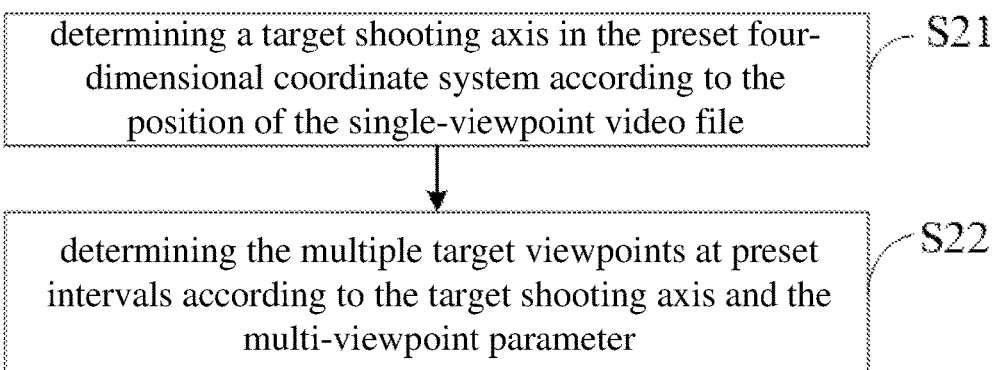
FIG. 4 is a schematic flow chart of a naked-eye suspended three-dimensional video display method according to a second embodiment of the present application.

Refer to FIG. 4, which is a schematic flow chart of a naked-eye suspended three-dimensional video display method according to a second embodiment of the present application.

Considering that the shooting effects of different target viewpoints may be different, in order to make the quality of the naked-eye suspended three-dimensional video higher, as shown in FIG. 4, based on the above first embodiment, in this embodiment, the above step S20 includes:

Step S21: determining a target shooting axis in the preset four-dimensional coordinate system according to the position of the single-viewpoint video file.

Figures 5, 6:
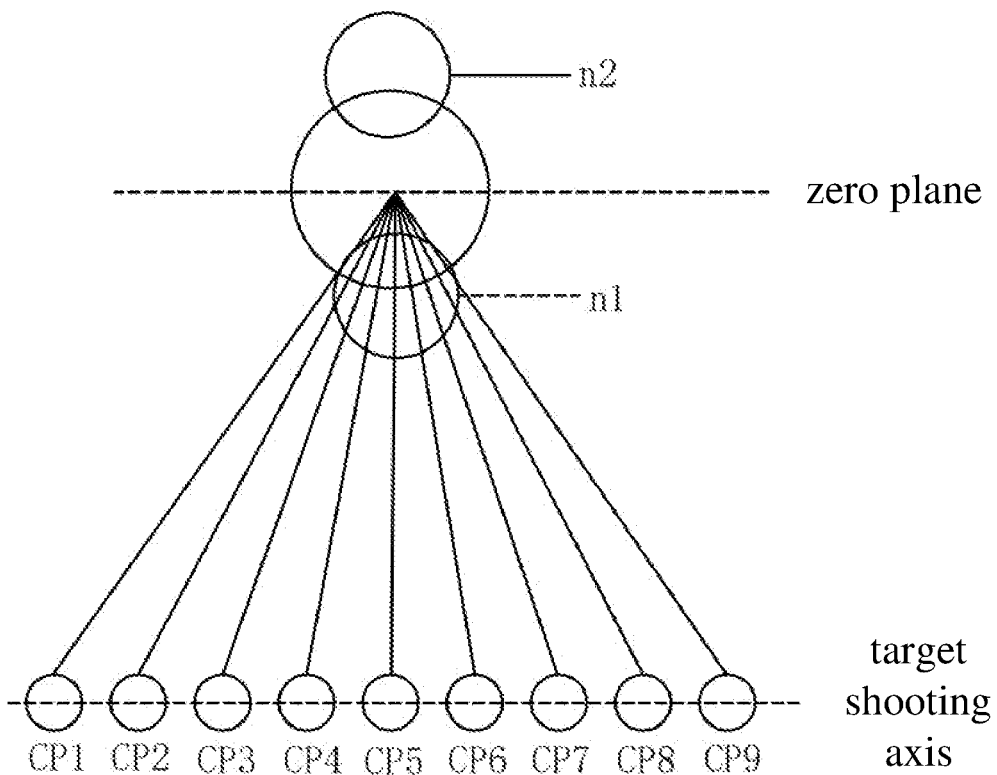
FIG. 5 is a schematic view of a position of a target viewpoint in the naked-eye suspended three-dimensional video display method according to the second embodiment of the present application.
FIG. 6 is a schematic flow chart of a naked-eye suspended three-dimensional video display method according to a third embodiment of the present application.

It should be noted that the length direction of the target shooting axis is the same as the X-axis direction. For ease of understanding, refer to FIG. 5 for explanation. FIG. 5 is a schematic view of a position of a target viewpoint in the naked-eye suspended three-dimensional video display method according to the second embodiment of the present application. As shown in FIG. 5, the zero plane is the above-mentioned display screen plane, n1 and n2 are the preset parallax, that is, the distance from the zero plane. In this example, the preset parallax is set to n1, and then the above-mentioned equipment can place the single-viewpoint video file into the position corresponding to the above-mentioned n1, a target shooting axis is determined in the preset four-dimensional coordinate system according to the position of the above-mentioned single-viewpoint video file, the distance between the above target shooting axis and the zero plane can be set according to the actual situation.

Step S22: determining the multiple target viewpoints at preset intervals according to the target shooting axis and the multi-viewpoint parameter.

It can be understood that, as shown in FIG. 5, since the above embodiment takes eight viewpoints for explanation, CP1 to CP8 are the above eight target viewpoints, but when rendering, the form of a nine-square grid is generally used, thus CP9 is set as the virtual target viewpoint. The above preset intervals can be 0.7 units, or other units.

It should be understood that after the target viewpoint position is determined, virtual cameras can be placed at each target viewpoint. The field of view of the virtual camera can be 45 degrees, and the convergence point of each virtual camera is an anchor point.

In a specific implementation, the above equipment can determine a target shooting axis in the preset four-dimensional coordinate system according to the position of the single-viewpoint video file, determine the multiple target viewpoints at preset intervals according to the target shooting axis and the multi-viewpoint parameter, and set a virtual camera on the target viewpoint for rendering, which can improve the rendering effect.

Furthermore, in order to improve the rendering effect, based on the above-mentioned first embodiment, in this embodiment, the above-mentioned step S30 includes: shooting the single-viewpoint video file based on each target viewpoint, and obtaining a shooting file; and coloring each pixel in the shooting file, and obtaining the parallax file corresponding to each target viewpoint.

It should be noted that the above rendering can be divided into six stages, namely vertex coloring, shape assembly, geometry coloring, rasterization, fragment coloring, and testing and mixing. In general, the above equipment can color each pixel in the shooting file to obtain a parallax file with different pixel colors.

This embodiment determines a target shooting axis in the preset four-dimensional coordinate system according to the position of the single-viewpoint video file, and determines the multiple target viewpoints at preset intervals according to the target shooting axis and the multi-viewpoint parameter; sets a virtual camera on the target viewpoint for shooting and obtains the shooting file, and renders the shooting file to obtain the parallax file corresponding to the target viewpoint.

Refer to FIG. 6, which is a schematic flow chart of a naked-eye suspended three-dimensional video display method according to a third embodiment of the present application.

Considering that different naked-eye suspended three-dimensional videos have different requirements for grating parameters, in order to improve the display effect, based on the above embodiments, the above step S50 includes:

step S51: obtaining a corresponding multi-viewpoint parameter according to the naked-eye suspended three-dimensional video;

step S52: determining the grating parameters according to the multi-viewpoint parameter.

It can be understood that the above grating parameters include grating tilt angle and grating pitch. The grating tilt angle is the tilt angle of the grating, and the grating pitch is the distance between gratings. The above naked-eye suspended three-dimensional video needs to correspond to the grating parameters. For example, the grating is m viewpoint, in order to ensure the display effect, the number of target viewpoints in the multi-viewpoint parameter mentioned above cannot be less than m, and the naked-eye suspended three-dimensional video with more than m target viewpoints can be displayed by the grating of m viewpoints.

It should be emphasized that the above-mentioned grating must be parallel to the display screen, and the angle between the tilt angle of the grating and the display is 0°. At the same time, the distance between the grating and the display screen can determine the best viewing distance for the user, and it can be set by oneself according to the actual situation.

Furthermore, in order to enable the above virtual camera to render the single-viewpoint video file, before the above steps of placing the single-viewpoint video file in the preset four-dimensional coordinate system based on the preset parallax, further includes: performing cutout processing to an original video file, and obtaining a transparent display video file; and taking the transparent display video file as the single-viewpoint video file.

It should be noted that the above cutout processing is essentially to cut out each frame of image in the original video file to separate the foreground image and background image in the image, and integrate the obtained foreground image into a transparent display video file.

In this embodiment, the corresponding number of target viewpoints can be obtained according to the naked-eye suspended three-dimensional video, and the grating parameters can be determined according to the number of target viewpoints, displaying by the corresponding grating parameters, thereby improving the display effect. At the same time, this embodiment can perform cutout processing to an original video file and obtain a transparent display video file, and take the transparent display video file as the single-viewpoint video file, thus facilitating subsequent rendering of the virtual camera.

In addition, the embodiment of the present application further proposes a storage medium, the storage medium stores a naked-eye suspended three-dimensional video display program, the naked-eye suspended three-dimensional video display method as described above is realized when the naked-eye suspended three-dimensional video display program is executed by a processor.

Figure 7:
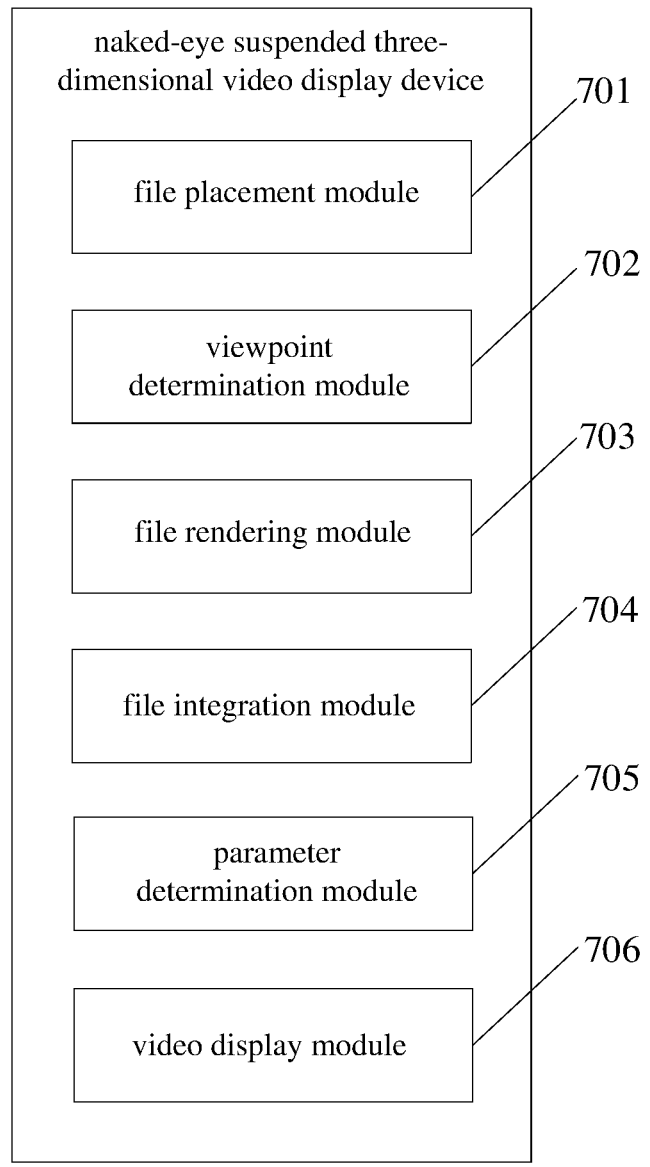
FIG. 7 is a structural block diagram of the naked-eye suspended three-dimensional video display device according to the first embodiment of the present application.

In addition, refer to FIG. 7, which is a structural block diagram of the naked-eye suspended three-dimensional video display device according to the first embodiment of the present application, embodiments of the present application further propose a naked-eye suspended three-dimensional video display device, which includes:

a file placement module 701 configured to place a single-viewpoint video file in a preset four-dimensional coordinate system based on a preset parallax, and the preset four-dimensional coordinate system is generated by a three-dimensional display coordinate system and a parallax coordinate axis, and the parallax coordinate axis is established based on a multi-viewpoint parameter and the three-dimensional display coordinate system;

a viewpoint determination module 702 configured to determine multiple target viewpoints in the preset four-dimensional coordinate system according to a position of the single-viewpoint video file and the multi-viewpoint parameter;

a file rendering module 703 configured to render the single-viewpoint video file based on each target viewpoint, and obtain a parallax file corresponding to each target viewpoint;

a file integration module 704 configured to render and integrate each parallax file, and obtain a naked-eye suspended three-dimensional video;

a parameter determination module 705 configured to determine grating parameters according to the naked-eye suspended three-dimensional video; and a video display module 706 configured to display the naked-eye suspended three-dimensional video according to the grating parameters.

In this embodiment, the above equipment can establish the parallax coordinate axis based on the multi-viewpoint parameter and the three-dimensional display coordinate system, at the same time, determine the corresponding display sub-coordinate system according to the multi-viewpoint parameter, and jointly establish the preset four-dimensional coordinate system according to the determined display sub-coordinate system and the parallax coordinate axis; then, determine the origin of the display sub-coordinate system on the parallax coordinate axis in the preset four-dimensional coordinate system based on the preset parallax, take the origin of the display sub-coordinate system as a target placement position, take the target placement position as a location of the single-viewpoint video file, and place the single-viewpoint video file in the target placement position; determine the coordinate position of the corresponding target viewpoints according to a position of the single-viewpoint video file in the preset four-dimensional coordinate system and the multi-viewpoint parameter; after shooting and rendering the single-viewpoint video file based on each target viewpoint, a parallax file corresponding to target viewpoint can be obtained; then render and integrate each parallax file, thereby a multi-viewpoint naked-eye suspended three-dimensional video can be obtained. When displaying, the above equipment can determine the grating parameters according to the relevant parameters of the naked-eye suspended three-dimensional video, and then display the above naked-eye suspended three-dimensional video according to the above grating parameters. Since this embodiment can render and integrate a single-viewpoint video file based on a preset four-dimensional coordinate system, obtain a naked-eye suspended three-dimensional video, and then display the above naked-eye suspended three-dimensional video by the corresponding grating parameters, so that the user can see a three-dimensional image with parallax with both eyes, thus enhancing the suspension effect, and improving the user experience at the same time.

Other embodiments or specific implementations of the naked-eye suspended three-dimensional video display device of the present application may refer to the above method embodiments, and will not be described again here.

It should be noted that in this article, the terms "comprise", "include" or any other variation thereof are intended to cover a non-exclusive inclusion, such that a process, method, article or system that includes a list of elements not only includes those elements, but also includes other elements not expressly listed, or also includes elements inherent to the process, method, article or system. In a case of without further restrictions, an element defined by the statement "includes a . . . " does not exclude the existence of other identical elements in a process, method, article or system that includes this element.

The above serial numbers of the embodiments of the present application are only for description and do not represent the advantages and disadvantages of the embodiments.

By the above description of the embodiments, those skilled in the art can clearly understand that the methods of the above embodiments can be implemented by means of software plus the necessary general hardware platform. Certainly, it can also be implemented by hardware. But in many cases the former is the better implementation. Based on this understanding, the essence of the technical solution of the present application or the part that contributes to the existing technology can be embodied in the form of software products. The computer software product is stored in a storage medium (such as read-only memory/Random Access Memory, disk, optical disk), which includes several instructions to cause a terminal equipment (which can be a mobile phone, a computer, a server, or a network equipment, etc.) to execute the methods described in various embodiments of the present application.

The above are only some embodiments of the present application, and are not intended to limit the scope of the present application. Under the concept of the present application, any equivalent structure transformation made by using the description and accompanying drawings of the present application, or directly or indirectly applied in other related technical fields, is included within the scope of the present application.

What is claimed is:

1. A naked-eye suspended three-dimensional video display method, comprising:

placing a single-viewpoint video file in a preset four-dimensional coordinate system based on a preset parallax, wherein the preset four-dimensional coordinate system is generated by a three-dimensional display coordinate system and a parallax coordinate axis, and the parallax coordinate axis is established based on a multi-viewpoint parameter and the three-dimensional display coordinate system;

determining multiple target viewpoints in the preset four-dimensional coordinate system according to a position of the single-viewpoint video file and the multi-viewpoint parameter;

rendering the single-viewpoint video file based on each target viewpoint, and obtaining a parallax file corresponding to each target viewpoint;

rendering and integrating each parallax file, and obtaining a naked-eye suspended three-dimensional video;

determining grating parameters according to the naked-eye suspended three-dimensional video; and displaying the naked-eye suspended three-dimensional video according to the grating parameters.

2. The naked-eye suspended three-dimensional video display method according to claim 1, wherein the placing the single-viewpoint video file in the preset four-dimensional coordinate system based on the preset parallax comprises:

determining a target placement position on the parallax coordinate axis in the preset four-dimensional coordinate system based on the preset parallax; and taking the target placement position as a location of the single-viewpoint video file, and placing the single-viewpoint video file in the target placement position.

3. The naked-eye suspended three-dimensional video display method according to claim 2, wherein before the determining the target placement position on the parallax coordinate axis in the preset four-dimensional coordinate system based on the preset parallax, the method further comprises:

establishing the parallax coordinate axis based on the multi-viewpoint parameter and the three-dimensional display coordinate system; and determining a display sub-coordinate system according to the multi-viewpoint parameter, and establishing the preset four-dimensional coordinate system according to the display sub-coordinate system and the parallax coordinate axis.

4. The naked-eye suspended three-dimensional video display method according to claim 1, wherein the determining multiple target viewpoints in the preset four-dimensional coordinate system according to the position of the single-viewpoint video file and the multi-viewpoint parameter comprises:

determining a target shooting axis in the preset four-dimensional coordinate system according to the position of the single-viewpoint video file; and determining the multiple target viewpoints at preset intervals according to the target shooting axis and the multi-viewpoint parameter.

5. The naked-eye suspended three-dimensional video display method according to claim 1, wherein the determining grating parameters according to the naked-eye suspended three-dimensional video comprises:

obtaining a corresponding multi-viewpoint parameter according to the naked-eye suspended three-dimensional video; and determining the grating parameters according to the multi-viewpoint parameter.

6. The naked-eye suspended three-dimensional video display method according to claim 1, wherein before the placing the single-viewpoint video file in the preset four-dimensional coordinate system based on the preset parallax, the method further comprises:

performing cutout processing on an original video file, and obtaining a transparent display video file; and taking the transparent display video file as the single-viewpoint video file.

7. The naked-eye suspended three-dimensional video display method according to claim 1, wherein the rendering the single-viewpoint video file based on each target viewpoint, and obtaining the parallax file corresponding to each target viewpoint comprises:

shooting the single-viewpoint video file based on each target viewpoint, and obtaining a shooting file; and coloring each pixel in the shooting file, and obtaining the parallax file corresponding to each target viewpoint.

8. A naked-eye suspended three-dimensional video display device, comprising:

a file placement module configured to place a single-viewpoint video file in a preset four-dimensional coordinate system based on a preset parallax, wherein the preset four-dimensional coordinate system is generated by a three-dimensional display coordinate system and a parallax coordinate axis, and the parallax coordinate axis is established based on a multi-viewpoint parameter and the three-dimensional display coordinate system;

a viewpoint determination module configured to determine multiple target viewpoints in the preset four-dimensional coordinate system according to a position of the single-viewpoint video file and the multi-viewpoint parameter;

a file rendering module configured to render the single-viewpoint video file based on each target viewpoint, and obtain a parallax file corresponding to each target viewpoint;

a file integration module configured to render and integrate each parallax file, and obtain a naked-eye suspended three-dimensional video;

a parameter determination module configured to determine grating parameters according to the naked-eye suspended three-dimensional video; and a video display module configured to display the naked-eye suspended three-dimensional video according to the grating parameters.

9. A naked-eye suspended three-dimensional video display equipment, comprising: a memory, a processor and a naked-eye suspended three-dimensional video display program stored on the memory and operable on the processor, wherein the naked-eye suspended three-dimensional video display program is configured to realize the naked-eye suspended three-dimensional video display method according to claim 1.

10. A non-transitory computer-readable storage medium storing a naked-eye suspended three-dimensional video display program, wherein the naked-eye suspended three-dimensional video display method according to claim 1 is realized when the naked-eye suspended three-dimensional video display program is executed by a processor.

* * * * *